(12) United States Patent
Gentile et al.

(10) Patent No.: US 6,587,863 B1
(45) Date of Patent: Jul. 1, 2003

(54) MULTIPHASE, INTERLEAVED DIRECT DIGITAL SYNTHESIS METHODS AND STRUCTURES

(75) Inventors: Ken Gentile, Bahama, NC (US); John Kornblum, Greensboro, NC (US)

(73) Assignee: Analog Devices, Inc., Norwood, MA (US)

( * ) Notice: Subject to any disclaimer, the term of this patent is extended or adjusted under 35 U.S.C. 154(b) by 483 days.

(21) Appl. No.: 09/605,099

(22) Filed: Jun. 27, 2000

(51) Int. Cl.[7] ................................................ G06F 1/02
(52) U.S. Cl. ....................................... 708/276; 708/270
(58) Field of Search ................................. 708/270–277, 708/651; 364/721–730

(56) References Cited

U.S. PATENT DOCUMENTS

| | | | |
|---|---|---|---|
| 4,992,743 A | * 2/1991 | Sheffer | 708/272 |
| 5,371,765 A | * 12/1994 | Guilford | 708/651 |
| 5,430,764 A | * 7/1995 | Chren, Jr. | 708/271 |
| 5,467,294 A | 11/1995 | Hu et al. | 364/721 |
| 5,519,343 A | 5/1996 | Britz | 327/106 |
| 5,598,437 A | * 1/1997 | Gourse | 708/271 |
| 5,673,212 A | 9/1997 | Hansen | 364/718 |
| 5,761,101 A | * 6/1998 | Erhage | 708/271 |
| 5,905,388 A | * 5/1999 | Van Der Valk et al. | 708/271 |
| 5,999,581 A | * 12/1999 | Bellaouar et al. | 708/271 |
| 6,005,419 A | * 12/1999 | Rudish | 708/271 |
| 6,060,917 A | * 5/2000 | Saul | 708/271 |

OTHER PUBLICATIONS

Amir Sodagar et al., aplitude Conversion in Sine–Output Direct Digital Frequency Synthesizers, 2000, IEEE, pp. 515–518.*

Stane Ciglarie et al., Special Considerations for Alternatively Designed Digital Phase Angle Standard, 1998, IEEE Transactions on Instrumentation and Measurement vol. 47 No. 1, pp. 199–203.*

*Synthesizer Data Book,* pp. 39–48 and 83–88, Qualcom Incorporated, San Diego, California, 92121.

* cited by examiner

Primary Examiner—Chuong Dinh Ngo
Assistant Examiner—Chat C. Do
(74) Attorney, Agent, or Firm—Koppel, Jacobs, Patrick & Heybl

(57) ABSTRACT

Direct digital synthesis (DDS) methods and structures are provided that increase DDS output frequencies $f_{out}$ without requiring a corresponding increase in the rate $f_{clk}$ at which DDS structures must operate. An exemplary method generates a periodic stream of digital words at a clock frequency $f_{clk}$ wherein the words represent respective amplitudes of a predetermined periodic waveform, the periodic stream has a period P and the digital words are spaced by a phase step $\phi_s$. This method comprises the steps of a) with a count capacity C, counting modulo $n\phi_s$ at a reduced clock frequency $(1/n)f_{clk}$ to thereby generate a primary substream of digital words, b) phase offsetting the primary substream to form n−1 secondary substreams of digital words wherein the primary and secondary substreams are phase spaced by the phase step $\phi_s$, c) converting the digital words of each of the primary, and secondary substreams to converted digital words that represent respective amplitudes of the predetermined waveform, and d) interleaving the primary and secondary substreams to thereby form the periodic stream of digital words that occur at the clock frequency $f_{clk}$.

25 Claims, 5 Drawing Sheets

MULTIPHASE, INTERLEAVED DIRECT DIGITAL SYNTHESIS METHODS AND STRUCTURES

BACKGROUND OF THE INVENTION

1. Field of the Invention

The present invention relates generally to direct digital synthesis.

2. Description of the Related Art

Figures 1A, 1B, 1C:
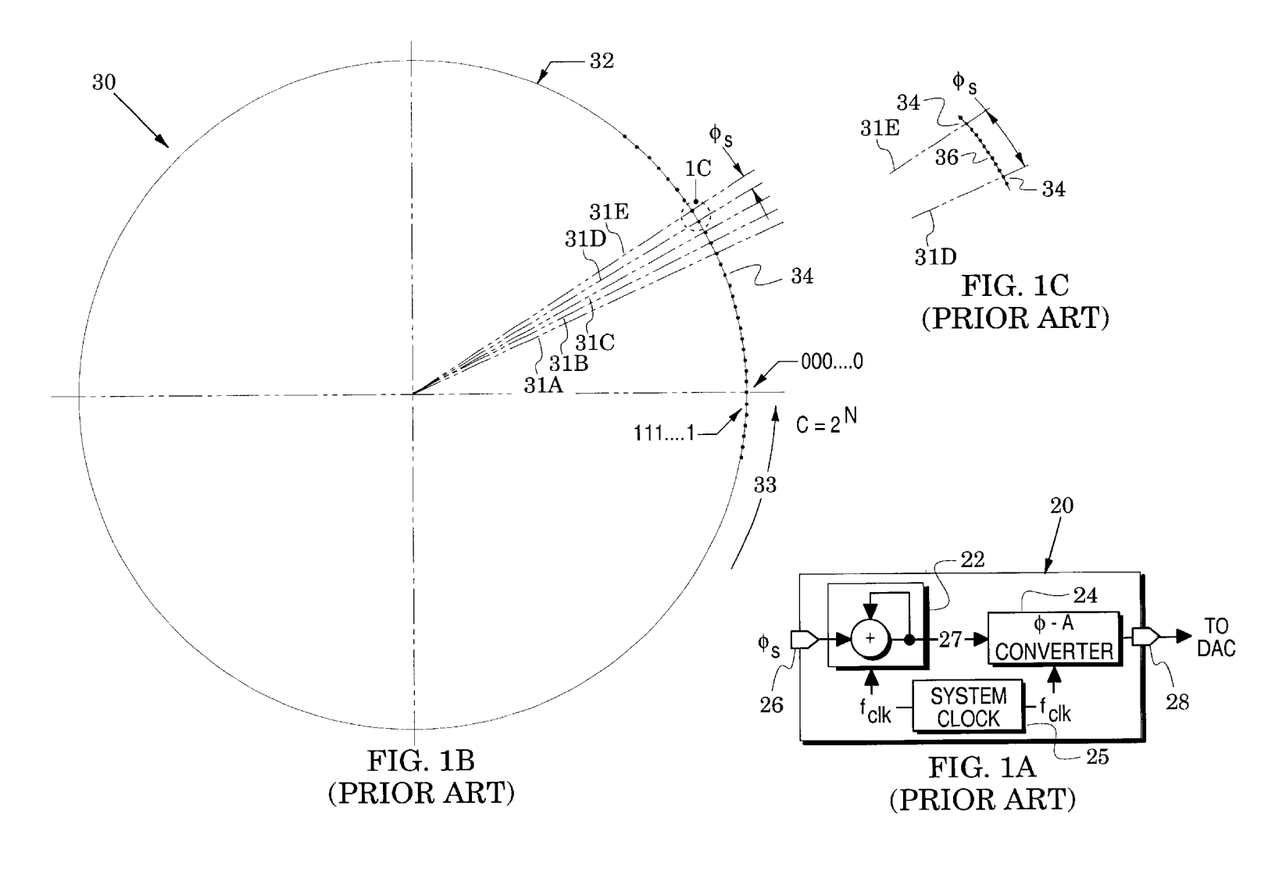
FIG. 1A is a block diagram of a conventional DDS generator.
FIG. 1B is a digital phase wheel diagram that illustrates functional methods of the conventional DDS generator of FIG. 1A.
FIG. 1C is an enlarged view of elements within the curved line 1C in FIG. 1B.

Direct digital synthesis (DDS) utilizes digital processing to generate output signals whose stability is referenced to a precision clock and whose frequency and phase are tunable. An exemplary conventional DDS generator 20 is shown in FIG. 1A. It includes a phase accumulator 22 and a phase-to-amplitude ($\phi$-A) converter 24 that both receive a clock signal $f_{clk}$ from a system clock 25.

The phase accumulator 22 is basically a modulo $\phi_s$ digital N-bit counter that counts at a rate $f_{clk}$ wherein $\phi_s$ is a phase step that is provided to the phase accumulator at a generator port 26. Accordingly, the phase accumulator delivers a periodic stream of digital works over a circuit path 27 to the $\phi$-A converter 24.

This operation can be illustrated with reference to a digital phase wheel 30 of FIG. 1B. As exemplified by successive radial rays 31A, 31B, 31C, 31D and 31E in this wheel, the phase accumulator repetitively counts around the wheel perimeter 32 (e.g., from an initial N-bit digital word 0000 . . . 0 to a final N-bit digital word 1111 . . . 1) to form the periodic stream of digital words. As further indicated in association with a process direction arrow 33, the N-bit phase accumulator 22 of FIG. 1A has a word capacity $C=2^N$ so that it generates a periodic stream of digital words over the circuit path 27 with a period $P=C/(\phi_s f_{clk})$. Stated differently, the phase accumulator 22 places digital words on the circuit path 27 at a rate of $f_{clk}$ and the periodic stream of words repeats at an output frequency of $f_{out}=(\phi_s f_{clk})/C$.

FIG. 1B appears to indicate that the phase step $\phi_s$ moves only between adjacent digital words 34. It should be understood, however, that FIG. 1B would need to show 268,435,456 digital words along its perimeter 32 to completely illustrate the operation of an exemplary 28-bit phase accumulator. Because of illustrative limits, such word density cannot be shown in the figures and, accordingly, the enlarged view of FIG. 1C indicates that additional words 36 may be located between each adjacent pair of the words 34 of FIG. 1B—the number of the additional words being a function of the size of the selected phase step $\phi_s$.

The periodic stream of digital words on the circuit path 27 of FIG. 1A includes a repetitive sequence from 000 . . . 0 to 111 . . . 1. This sequence expresses a linear relationship and, accordingly, a periodic analog ramp would be generated if the periodic stream were fed directly to a digital-to-analog converter (DAC). Therefore, the DDS generator 20 includes a $\phi$-A converter 24 which converts the digital words at respective phase locations to converted digital words at the generator output port 28 wherein the converted digital words represent respective amplitudes of any predetermined waveform (e.g., a sinusoidal waveform). A DDS synthesizer may then be realized by coupling a DAC to the generator output port 28.

When compared to other waveform synthesis techniques (e.g., phase-locked loop synthesis), DDS offers a number of attractive features which include:

a) extremely fine tuning resolution of the output frequency $f_{out}$, b) fast change of output phase and fast phase-continuous change of output frequency $f_{out}$;

c) generation of multiple phase-related periodic streams, d) performance that is not affected by component changes (due, for example, to aging and temperature), e) remote control (e.g., by digital processors), and f) integrated structure on a single chip (including an output DAC).

It is apparent that the output frequency $f_{out}$ of the DDS generator 20 can only be increased with a corresponding increase in the rate $f_{clk}$ at which the phase accumulator 22 and $\phi$-A converter 24 operate. This rate, however, is limited by the DDS generator's fabrication process. Complementary metal-oxide semiconductor (CMOS) processes, for example, are characterized by the minimum gate length (e.g., 0.25 microns) they can achieve and this gate length sets an upper bound on the operating rate of devices fabricated with the process.

In addition to this absolute limit, attempts to increase the operating rate $f_{clk}$ face other problems such as higher current slew rates, tighter timing requirements and the need for more extensive signal pipelining. As a result, circuit complexity and power dissipation are increased and larger device geometries are required. It is apparent, therefore, that substantial benefits would be realized with methods and structures that increased DDS output frequencies $f_{out}$ without requiring a corresponding increase in the operating rate $f_{clk}$.

SUMMARY OF THE INVENTION

The present invention is directed to DDS methods and structures that increase DDS output frequencies $f_{out}$ without requiring a corresponding increase in the rate $f_{clk}$ at which DDS structures must operate.

An exemplary method of the invention generates a periodic stream of digital words at a clock frequency $f_{clk}$ wherein the words represent respective amplitudes of a predetermined periodic waveform, the periodic stream has a period P and the digital words are spaced by a phase step $\phi_s$. The method comprises the steps of:

a) with a count capacity C, counting modulo n$\phi_s$ at a reduced clock frequency (1/n)$f_{clk}$ to thereby generate a primary substream of digital words;

b) phase offsetting the primary substream to form n-1 secondary substreams of digital words wherein the primary and secondary substreams are phase spaced by the phase step $\phi_s$;

c) converting the digital words of each of the primary and secondary substreams to converted digital words that represent respective amplitudes of the predetermined waveform; and d) interleaving the primary and secondary substreams to thereby form the periodic stream of digital words that occur at the clock frequency $f_{clk}$.

These process steps can be practiced with any integer n and they form a multiphase, interleaved method that generates a periodic stream of digital words that occur at a clock frequency $f_{clk}$ but realizes this stream with counting, offsetting and converting processes that are realized at a substantially reduced frequency (1/n)$f_{clk}$. Therefore, significant improvements in DDS operational parameters (e.g., decrease of current slew rates, decrease of data pipelining, reduced circuit complexity and power dissipation and smaller device geometries) are realized.

DDS generator and synthesizer embodiments are also provided for practicing the methods of the invention.

The novel features of the invention are set forth with particularity in the appended claims. The invention will be best understood from the following description when read in conjunction with the accompanying drawings.

DETAILED DESCRIPTION OF THE PREFERRED EMBODIMENTS

Figure 2A:
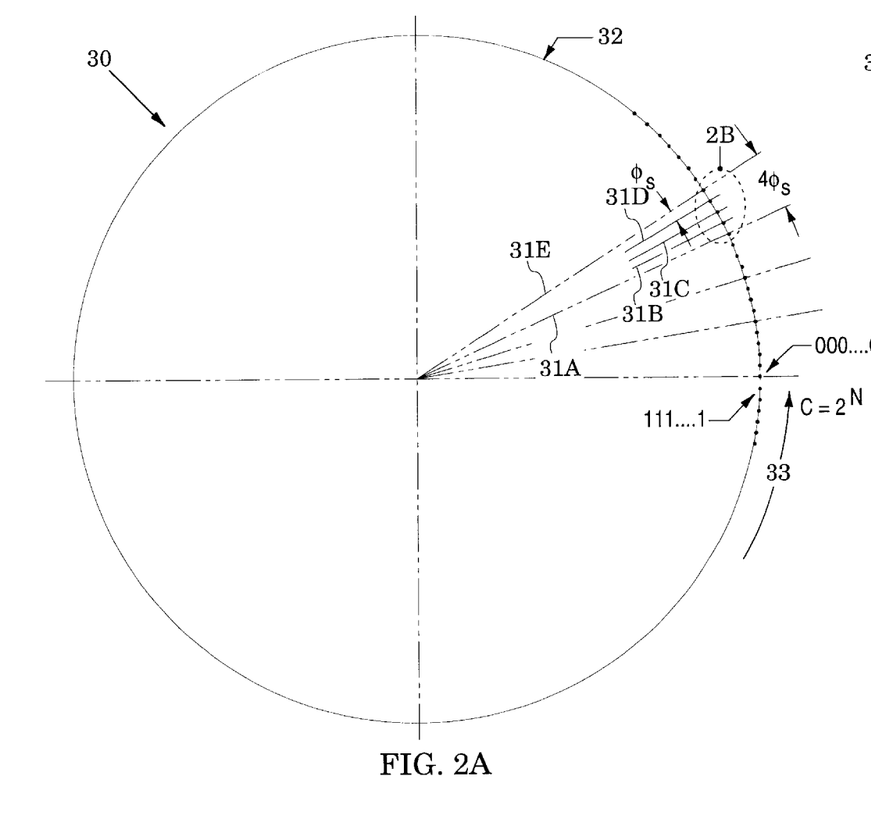
FIG. 2A is a digital phase wheel diagram that illustrates a DDS method embodiment of the present invention.
Figure 2B:
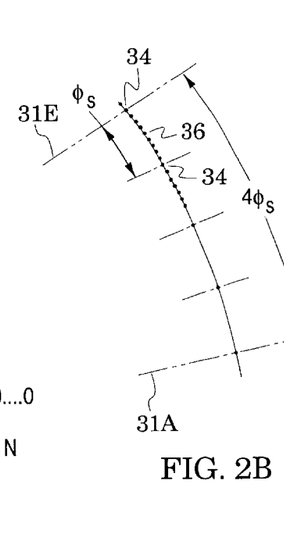
FIG. 2B is an enlarged view of elements within the curved line 2B in FIG. 2A.
Figure 3:
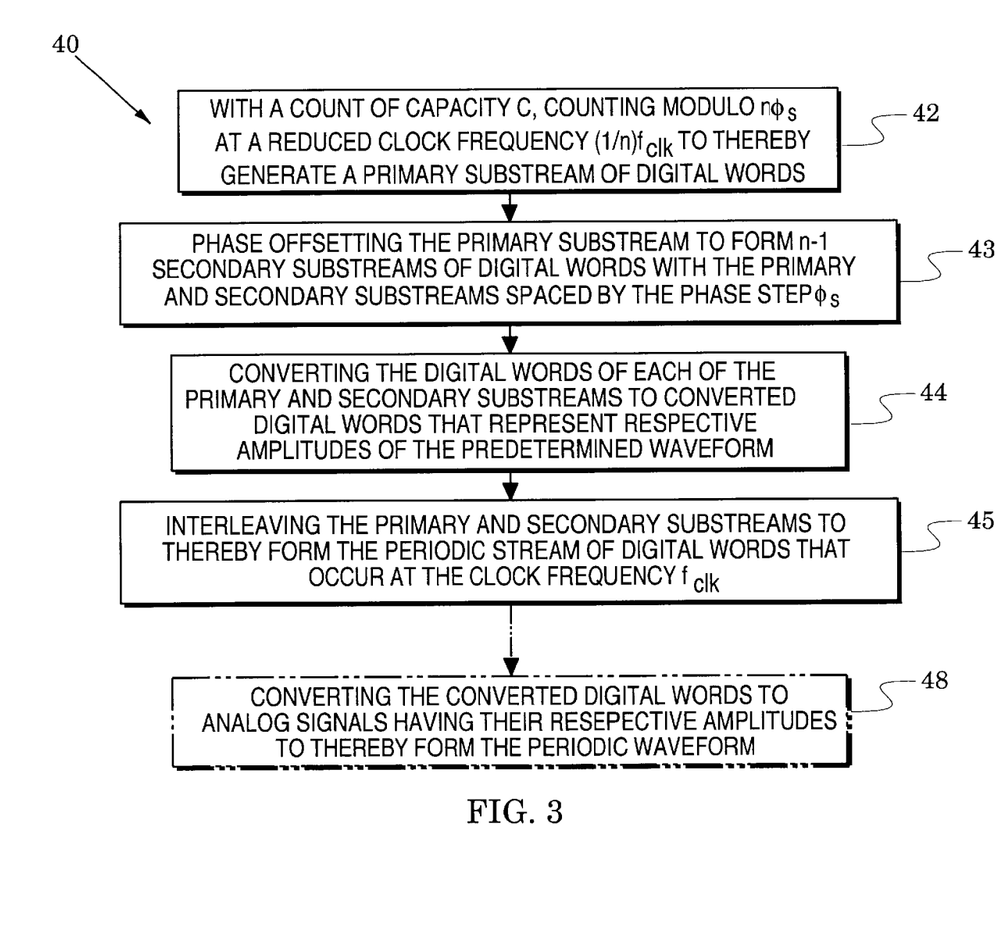
FIG. 3 is a flow chart that shows process steps of the invention that are exemplarized by the digital phase wheel diagram of FIG. 2A.

The flow chart 40 of FIG. 3 recites DDS process steps of the present invention which increase DDS output frequencies $f_{out}$ without requiring a corresponding increase in the rate $f_{clk}$ at which important DDS structures must operate. To facilitate a description of these steps, reference will be made to FIGS. 2A and 2B which have elements similar to those of FIGS. 1B and 1C and, accordingly, like elements of these figures are indicated by like reference numbers.

In particular, the flow chart 40 is directed to a method for generating, a periodic stream of digital words that occur at a clock frequency $f_{clk}$ and represent respective amplitudes of a predetermined periodic waveform wherein the periodic stream has a period P and the digital words are spaced by a phase step $\phi_s$.

The first process step 42 utilizes a count capacity C to count modulo $n\phi_s$ at a reduced clock frequency $(1/n)f_{clk}$ to thereby generate a primary substream of digital words. Although the processes of the invention may be practiced with any integer n, FIGS. 2A and 2B illustrate an exemplary n of 4. Thus, FIG. 2A shows an exemplary phase step $4\phi_s$ as indicated by successive radial rays 31A and 31E.

In process step 43, the primary substream is phase offset to form n−1 secondary substreams of digital words wherein the primary and secondary substreams are phase spaced by the phase step $\phi_s$. This step is illustrated in FIG. 2A by three (n−1) successive radial rays 31B, 31C and 31D which are arranged so that they and the radial ray 31A are spaced by the phase step $\phi_s$.

It is noted at this point that the secondary substreams are not generated by counting as is the primary substream but, rather, are formed by being offset from the primary substream. This is indicated by FIG. 2B which also illustrates the generated radial ray 31A and the successively offset radial rays 31B, 31C and 31D and further illustrates additional digital words 36 that may lie between the digital words 34 that correspond to these radial rays.

The digital words of each of the primary and secondary substreams are converted in process step 44 of FIG. 3 to converted digital words that represent respective amplitudes of the predetermined periodic waveform (the phrases "digital words" and "converted digital words" are used herein to clearly differentiate words before and after the conversion of process step 44). Finally, the primary and secondary substreams are time interleaved in process step 45 to thereby form the desired periodic stream of digital words that occur at the clock frequency $f_{clk}$.

It is apparent that the process steps of FIG. 3 generate a periodic stream of digital words that occur at a clock frequency $f_{clk}$ but realizes this stream with counting, offsetting and converting processes (processes 42–44 of FIG. 3) that can be realized at a significantly reduced frequency $(1/n)f_{clk}$. In particular, digital words of the primary substream are provided by counting at the reduced rate $(1/n)f_{clk}$, the subsequent offsetting step is performed on each digital word and is therefore also performed at the reduced rate $(1/n)f_{clk}$ and, the converting step is performed separately on each of the primary and secondary substreams of digital words and thus also proceeds at the reduced rate $(1/n)f_{clk}$.

Because the speed at which the process steps of FIG. 3 operate is reduced by 1/n (e.g., by ¼ or by ⅛), significant improvements of many DDS parameters (e.g., decreased current slew rates, decreased data pipelining, reduced circuit complexity and power dissipation and smaller device geometries) may be realized.

The process steps 42–45 of FIG. 3 facilitate the DDS generation of a periodic stream of digital words. This stream may then be converted into a periodic waveform by the process 48 of FIG. 3 which converts the converted digital words to analog signals that have the respective amplitudes (of step 44). The step 48 is shown in broken lines to indicate that it is an addition to the steps 42–45 that generate a periodic stream of digital words.

Figure 4:
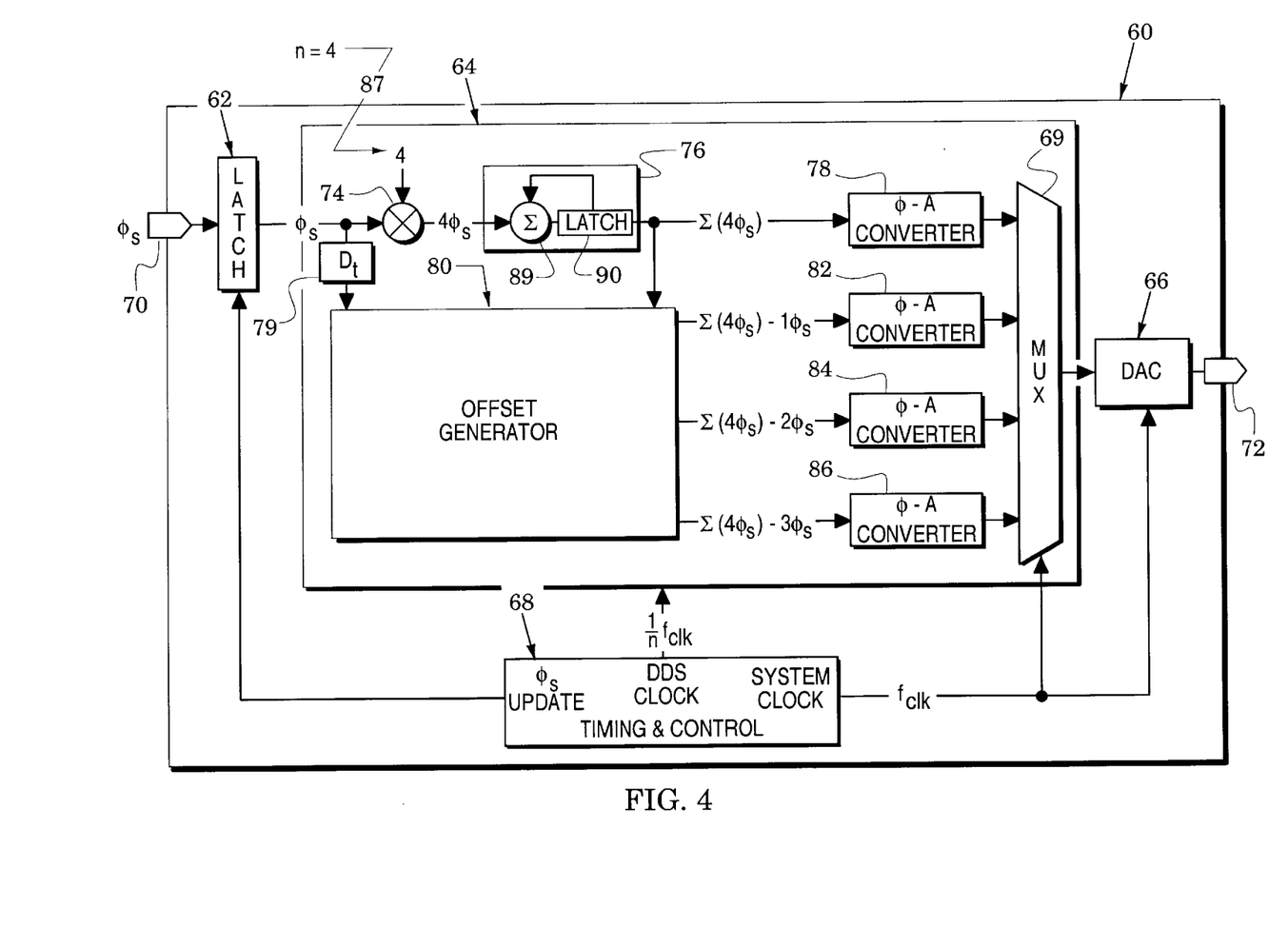
FIG. 4 is a block diagram of a DDS synthesizer embodiment of the invention for practicing the processes of FIG. 4.

The processes illustrated by FIG. 3 may be practiced with the DDS synthesizer 60 of FIG. 4. The synthesizer 60 includes a phase step latch 62, a DDS generator 64, a DAC 66 and timing and control 68. The latter module provides a phase step update command to the phase step latch 62, a DDS clock $(1/n)f_{clk}$ to the DDS generator 64 and a system clock $f_{clk}$ to the DAC 66 and to a multiplexer (MUX) 69 of the DDS generator 64.

The DDS synthesizer 60 has an input port 70 that is coupled to the latch 62 and an output port 72 that is coupled to the DAC 66. In addition to the mulitplexer 69, the DDS generator 64 includes a multiplier 74, a phase accumulator 76 and a φ-A converter 78 that are serially coupled between the latch 62 and the multiplexer 69. The output of the latch 62 is coupled through a time delay 79 to an offset generator 80 which also receives an input from the phase accumulator 76. Offset signals of the offset generator are coupled through additional φ-A converters 82, 84 and 86 to the multiplexer 69.

In operation of the DDS synthesizer 60, the value of the phase step $\phi_s$ at the input port 70 determines the quantization resolution in an analog waveform that will be synthesized at the output port 72. Once the phase step $\phi_s$ has been selected, it is latched to the DDS generator 64 by the phase step update command (from the timing and control 68) and is multiplied by an integer n in a multiplier 74 to thereby apply a phase step $n\phi_s$ to the phase accumulator 76. The DDS clock $(1/n)f_{clk}$ and the system clock $f_{clk}$ are related by the same integer n. Although the invention can be practiced with any integer n (e.g., 8), the exemplary DDS architecture of FIG. 4 is shown for a selected value of 4 (the selection of n is indicated by selection arrow 87 in the upper left of FIG. 4).

Because n has been selected to be 4, the multiplier 74 applies a phase step $4\phi_s$ to the phase accumulator 76. Accordingly, the phase accumulator counts modulo $4\phi_s$ to generate a periodic primary substream of digital words as recited in process step 42 of FIG. 3 and illustrated in FIG. 2A. The primary substream of digital words is mathematically expressed in FIG. 4 by the expression $\Sigma 4\phi_s$ and it is converted to converted digital words that represent respective amplitudes of a predetermined waveform (e.g., a sinusoidal waveform) by the $\phi$-A converter 78. This conversion is in accordance with process step 44 of FIG. 3.

The phase step $\phi_s$ and the primary substream $\Sigma 4\phi_s$ are both input to the offset generator 80 which responds by generating n–1 secondary substreams of digital words that are offset from the primary substream $\Sigma 4\phi_s$ by phases $1\phi_s$, $2\phi_s$ and $3\phi_s$. Thus, the primary and secondary substreams are phase spaced by the phase step $\phi_s$ that is applied to the input port 70. The delay 79 is preferably selected to match delays through the phase accumulator 76 so that the phase step $\phi_s$ and the primary substream $\Sigma 4\phi_s$ are aligned when received by the offset generator 80.

In the DDS generator embodiment of FIG. 4, the offset generator 80 is arranged to phase delay the secondary substreams from the primary substream so that they are mathematically expressed in FIG. 4 as $\Sigma 4\phi_s-1\phi_s$, $\Sigma 4\phi_s-2\phi_s$ and $\Sigma 4\phi_s-3\phi_s$. This exemplary offset arrangement is the same as that illustrated in the digital phase wheel 30 of FIG. 2A and the offsetting operation of the offset generator 80 is in accordance with process step 43 of FIG. 3. Each of the $\phi$-A converters 82, 84 and 88 convert their respective secondary substream to converted digital words that represent respective amplitudes of the predetermined waveform. This converting operation is recited as process step 44 in FIG. 3.

The multiplexer 69 then interleaves the primary and secondary substreams at a rate $f_{clk}$ to form a periodic stream of digital words that are provided to the DAC 66. The interleaving sequence of the multiplexer 69 must be in accordance with the particular offset arrangement of secondary substreams that has been generated by the offset generator 80. It can be seen from the same offset arrangement that is shown in FIG. 2A, that the multiplexer 69 must couple the converter outputs to the DAC 66 in the sequence of $\phi$-A converter 86, $\phi$-A converter 84, $\phi$-A converter 82 and $\phi$-A converter 78 (i.e., the multiplexing must follow the direction arrow 33 in FIG. 2A. This interleaving operation is in accordance with process step 45 of FIG. 3.

At the rate of the system clock $f_{clk}$, the DAC 66 then converts the digital words of the periodic stream to analog signals that have the respective amplitudes that are represented by the digital words. This final operation is in accordance with process step 48 of FIG. 3.

The phase accumulator 76 and offset generator 80 can be realized in various embodiments. In an exemplary structure, the phase accumulator of FIG. 4 comprises an adder 89 and a latch 90 that responds to the adder. A first input of the adder receives the phase step $n\phi_s$ from the multiplier 74 and the output of the latch 90 is coupled to a second input of the adder.

Figure 5:
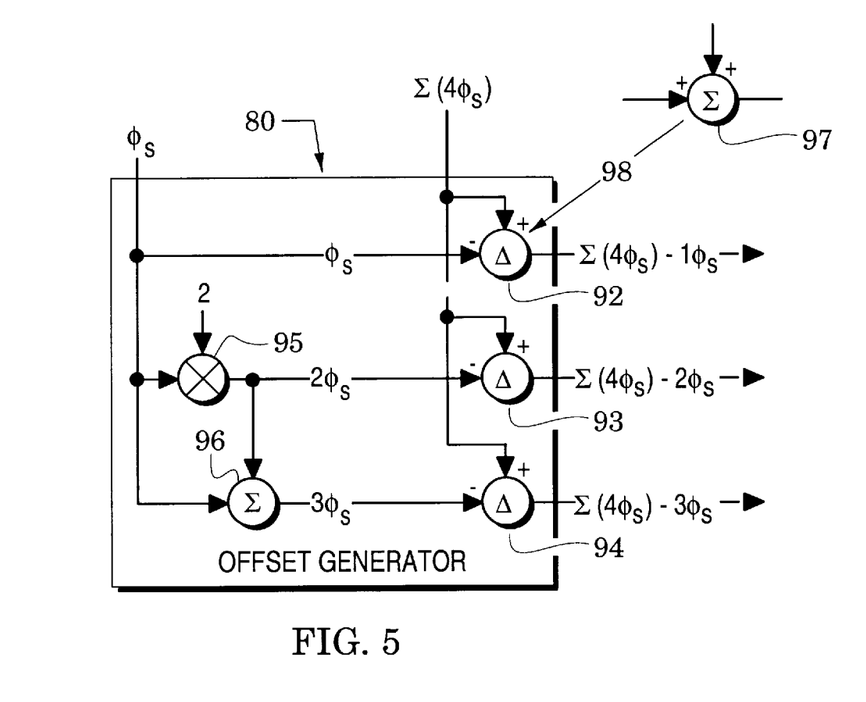
FIG. 5 is a block diagram of an offset generator embodiment in the DDS synthesizer of FIG. 3.

FIG. 5 shows an exemplary embodiment of the offset generator 80 that includes differencers 92, 93 and 94, a multiplier 95 and an adder 96. The phase step $\phi_s$ (received from the time delay 79 of FIG. 4) is multiplied by the multiplier 95 to provide a phase $2\phi_s$. The adder 96 provides a phase $3\phi_s$ in response to the phase step and the multiplier 95. The phases $1\phi_s$, $2\phi_s$ and $3\phi_s$ are coupled respectively to the differencers 92, 93 and 94 which also receive the primary substream $\Sigma 4\phi_s$ (from the phase accumulator 76 of FIG. 4). In response to their inputs, the differencers then generate the secondary substreams $\Sigma 4\phi_s-1\phi_s$, $\Sigma 4\phi_s-2\phi_s$ and $\Sigma 4\phi_s-3\phi_s$ as shown in FIG. 5.

The digital phase wheel 30 of FIG. 2A shows that the radial rays 31B, 31C and 31D are spaced by the phase step $\phi_s$, but various successive arrangements that meet this condition can be used in practicing the invention. For example, the secondary substreams can lead the primary substream rather than lag it as indicated by the phase wheel 30. This is achieved in the offset generator 80 of FIG. 5 by replacing each of the differencers 92, 93 and 94 with an adder 97 as indicated by the exemplary replacement arrow 98. Other successive arrangements can be formed, for example, by having at least one secondary substream leading the primary substream and the other secondary substreams lagging the primary substream. The only limitation is that all of the substreams are spaced by the phase step $\phi_s$.

The DDS generator 64 of FIG. 4 can be advantageously used to construct various useful synthesis structures of which the DDS synthesizer 60 is but one example. Because of the features of the invention, the DDS generator 64 can generate digital words at rates that are extended by an integer n above rates that are limited by the generator's fabrication process.

This rate extension is enhanced by increasing the integer n but this increases the circuit complexity (e.g., it increases the number of $\phi$-A converters in FIG. 4 and the number of differencers 92, 93 and 94 in FIG. 5) and, slows the rate at which new phase step selections can be latched through the latch 62 of FIG. 4. Circuit simulations have shown, however, that the benefits of the reduced power dissipation (realized particularly in the phase accumulator 76 and $\phi$-A converters 78, 82, 84 and 86) more than outweigh the additional circuit complexity.

Multipliers of the invention (e.g., multipliers 74 and 95 shown respectively in FIGS. 4 and 5) are configured to perform a multiplier function and may be realized with various conventional structures and functions (e.g., discrete logic elements and bit shifting).

The multiphase, interleaved teachings of the invention may be practiced with various semiconductor processes. In an exemplary fabrication, for example, the DDS generator 23 of FIG. 4 is realized with CMOS transistors and the multiplexer 29 and DAC 30 are realized with bipolar junction transistors.

The preferred embodiments of the invention described herein are exemplary and numerous modifications, variations and rearrangements can be readily envisioned to achieve substantially equivalent results, all of which are intended to be embraced within the spirit and scope of the invention as defined in the appended claims.

We claim:

1. A method of generating a periodic stream of digital words that occur at a clock frequency $f_{clk}$ and represent respective amplitudes of a predetermined periodic waveform wherein said periodic stream has a period P and said digital words are spaced by a phase step $\phi_s$ that is a portion of said period, the method comprising the steps of:

with a count capacity C, counting modulo $n\phi_s$ at a reduced clock frequency $(1/n)f_{clk}$ to thereby generate a primary substream of digital words;

phase offsetting said primary substream to form n−1 secondary substreams of digital words wherein said primary and secondary substreams are phase spaced by said phase step $\phi_s$;

converting the digital words of each of said primary and secondary substreams to converted digital words that represent respective amplitudes of said predetermined waveform; and interleaving said primary and secondary substreams to thereby form said periodic stream of digital words that occur at said clock frequency $f_{clk}$.

2. The method of claim 1, wherein n=4.

3. The method of claim 1, wherein n=8.

4. The method of claim 1, wherein said converting step includes the step of providing, at said reduced clock frequency $(1/n)f_{clk}$, said converted digital words from a lookup table.

5. The method of claim 1, wherein said converting step includes the step of generating, at said reduced clock frequency $(1/n)f_{clk}$, said converted digital words with a computational engine.

6. The method of claim 1, wherein said predetermined periodic waveform is a sinusoidal waveform.

7. A method of generating a periodic stream of digital words that occur at a clock frequency $f_{clk}$ and represent respective amplitudes of a predetermined periodic waveform wherein said periodic stream has a period P and said digital words are spaced by a phase step $\phi_s$ that is a portion of said period, the method comprising the steps of:

with a count capacity C, counting modulo $n\phi_s$ at a reduced clock frequency $(1/n)f_{clk}$ to thereby generate a primary substream of digital words; phase offsetting said primary substream to form n−1 secondary substreams of digital words wherein said primary and secondary substreams are phase spaced by said phase step $\phi_s$;

converting the digital words of each of said primary and secondary substreams to converted digital words that represent respective amplitudes of said predetermined waveform; and interleaving said primary and secondary substreams to thereby form said periodic stream of digital words that occur at said clock frequency $f_{clk}$;

wherein said offsetting step includes the steps of:
providing n−1 phase steps $k\phi_s$ wherein k represents integers from 1 to n−1; and
subtracting said phase steps $k\phi_s$ from said primary substream to generate said secondary substreams.

8. A method of generating a periodic stream of digital words that occur at a clock frequency fclk and represent respective amplitudes of a predetermined periodic waveform wherein said periodic stream has a period P and said digital words are spaced by a phase $\phi_s$ that is portion of said period, the method comprising the steps of:

with a count capacity C, counting modulo $n\phi_s$ at a reduced clock frequency $(1/n)f_{clk}$ to thereby generate a primary substream of digital words;

phase offsetting said primary substream to form n−1 secondary substreams of digital words wherein said primary and secondary substreams are phase spaced by said phase step $\phi_s$;

converting the digital words of each of said primary and secondary substreams to converted digital words that represent respective amplitudes of said predetermined waveform; and interleaving said primary and secondary substreams to thereby form said periodic stream of digital words that occur at said clock frequency $f_{clk}$;

wherein said offsetting step includes the steps of:
providing n−1 phase steps $k\phi_s$ wherein k represents integers from 1 to n−1; and
adding said phase steps $k\phi_s$ to said primary substream to generate said secondary substreams.

9. A method of generating a periodic stream of digital words that occur at a clock frequency $f_{clk}$ and represent respective amplitudes of a predetermined periodic waveform wherein said periodic stream has a period P and said digital words are spaced by a phase step $\phi_s$ that is a portion of said period, the method comprising the steps of:

with a count capacity C, counting modulo $n\phi_s$ at a reduced clock frequency $(1/n)f_{clk}$ to thereby generate a primary substream of digital words;

phase offsetting said primary substream to form n−1 secondary substreams of digital words wherein said primary and secondary substreams are phase spaced by said phase step $\phi_s$;

converting the digital words of each of said primary and secondary substreams to converted digital words that represent respective amplitudes of said predetermined waveform; and interleaving said primary and secondary substreams to thereby form said periodic stream of digital words that occur at said clock frequency $f_{clk}$;

wherein said interleaving step includes the step of multiplexing said primary and secondary streams at said clock frequency $f_{clk}$.

10. A method of generating a periodic waveform that has a period P and is quantized in a phase step $\phi_s$ that occurs at a clock frequency $f_{clk}$, the method comprising the steps of:

with a count of capacity C, counting modulo $n\phi_s$ at a reduced clock frequency $(1/n)f_{clk}$ to thereby generate a primary substream of digital words;

phase offsetting said primary substream to form n−1 secondary substreams of digital words wherein said primary and secondary substreams are phase spaced by said phase step $\phi_s$;

converting the digital words of each of said primary and secondary substreams to converted digital words that represent respective amplitudes of said periodic waveform;

interleaving said primary and secondary substreams to thereby form a periodic stream of converted digital words that occur at said clock frequency $f_{clk}$; and converting said converted digital words to analog signals, that have said respective amplitudes to thereby form said periodic waveform.

11. The method of claim 10, wherein n=4.

12. The method of claim 10, wherein n=8.

13. The method of claim 10, wherein said converting step includes the step of providing, at said reduced clock frequency $(1/n)f_{clk}$, said converted digital words from a lookup table.

14. The method of claim 10, wherein said interleaving step includes the step of multiplexing said primary and secondary streams at said clock frequency $f_{clk}$.

15. The method of claim 10, further including the step of performing said converting step with a digital-to-analog converter.

16. A method of generating a periodic waveform that has a period P and is quantized in a phase step $\phi_s$ that occurs at a clock frequency $f_{clk}$ the method comprising the steps of:

with a count of capacity C, counting modulo $n\phi_s$ at a reduced clock frequency $(1/n)f_{clk}$ to thereby generate a primary substream of digital words;

phase offsetting said primary substream to form n−1 secondary substreams of digital words wherein said primary and secondary substreams are phase spaced by said phase step $\phi_s$;

converting the digital words of each of said primary and secondary substreams to converted digital words that represent respective amplitudes of said periodic waveform;

interleaving said primary and secondary substreams to thereby form a periodic stream of converted digital words that occur at said clock frequency $f_{clk}$; and converting said converted digital words to analog signals that have said respective amplitudes to thereby form said periodic waveform;

wherein said offsetting step includes the steps of:
 providing n−1 phase steps $k\phi_s$ wherein k represents integers from 1 to n−1; and
 subtracting said phase steps $k\phi_s$ from said primary substream to generate said secondary substreams.

17. A method of generating a periodic waveform that has a period P and is quantized in a phase step $\phi_s$ that occurs at a clock frequency $f_{clk}$, the method comprising the steps of:

with a count of capacity C, counting modulo $n\phi_s$ at a reduced clock frequency $(1/n)f_{clk}$ to thereby generate a primary substream of digital words;

phase offsetting said primary substream to form n−1 secondary substreams of digital words wherein said primary and secondary substreams are phase spaced by said phase step $\phi_s$;

converting the digital words of each of said primary and secondary substreams to converted digital words that represent respective amplitudes of said periodic waveform;

interleaving said primary and secondary substreams to thereby form a periodic stream of converted digital words that occur at said clock frequency $f_{clk}$; and converting said converted digital words to analog signals that have said respective amplitudes to thereby form said periodic waveform;

wherein said offsetting step includes the steps of:
 providing n−1 phase steps $k\phi_s$ wherein k represents integers from 1 to n−1; and
 adding said phase steps $k\phi_s$ to said primary substream to generate said secondary substreams.

18. A method of generating a periodic waveform that has a period P and is quantized in a phase step $\phi_s$ that occurs at a clock frequency $f_{clk}$, the method comprising the steps of:

with a count of capacity C, counting modulo $n\phi_s$ at a reduced clock frequency $(1/n)f_{clk}$ to thereby generate a primary substream of digital words;

phase offsetting said primary substream to form n−1 secondary substreams of digital words wherein said primary and secondary substreams are phase spaced by said phase step $\phi_s$;

converting the digital words of each of said primary and secondary substreams to converted digital words that represent respective amplitudes of said periodic waveform;

interleaving said primary and secondary substreams to thereby form a periodic stream of converted digital words that occur at said clock frequency $f_{clk}$; and converting said converted digital words to analog signals that have said respective amplitudes to thereby form said periodic waveform;

wherein said periodic waveform is a sinusoidal waveform.

19. A generator that generates a periodic stream of digital words that occur at a clock frequency $f_{clk}$ and represent respective amplitudes of a predetermined periodic waveform wherein said periodic stream has a period P and said digital words are spaced by a phase step $\phi_s$ that is a portion of said period, the generator comprising:

a phase accumulator that generates, at a reduced clock frequency $(1/n)f_{clk}$, a primary substream of digital words wherein said primary substream has said period P and said digital words are spaced by a phase step $n\phi_s$;

an offset generator that offsets said primary substream to thereby generate n−1 secondary substreams of digital words wherein said primary and secondary substreams are phase spaced by said phase step $\phi_s$;

n phase-to-amplitude converters that each convert a respective one of said primary and secondary substreams to converted digital words that represent respective amplitudes of said periodic waveform; and a multiplexer that interleaves said primary and secondary substreams to thereby form said periodic stream of digital words that occur at said clock frequency $f_{clk}$.

20. The generator of claim 19, wherein said phase accumulator includes:

an adder having first and second input ports; and a latch that responds to said adder and has an output port coupled to said second input port;

said latch thus providing said primary substream at said output port when said phase step $n\phi_s$ is coupled to said first input port.

21. The generator of claim 19, wherein each of said phase-to-amplitude converters comprises a memory having a stored lookup table.

22. The generator of claim 19, wherein each of said phase-to-amplitude converters comprises a computational engine.

23. A generator that generates a periodic stream of digital words that occur at a clock frequency $f_{clk}$ and represent respective amplitudes of a predetermined periodic waveform wherein said periodic stream has a period P and said digital words are spaced by a phase step $\phi_s$ that is a portion of said period, the generator comprising:

a phase accumulator that generates, at a reduced clock frequency $(1/n)f_{clk}$, a primary substream of digital words wherein said primary substream has said period P and said digital words are spaced by a phase step $n\phi_s$;

an offset generator that offsets said primary substream to thereby generate n−1 secondary substreams of digital words wherein said primary and secondary substreams are phase spaced by said phase step $\phi_s$;

n phase-to-amplitude converters that each convert a respective one of said primary and secondary substreams to converted digital words that represent respective amplitudes of said periodic waveform; and a multiplexer that interleaves said primary and secondary substreams to thereby form said periodic stream of digital words that occur at said clock frequency $f_{clk}$;

wherein said offset generator includes:
 a phase-step generator that provides n−1 phase steps $k\phi_s$ wherein k represents integers from 1 to n−1; and
 n−1 differencers that generate said n−1 secondary substreams in response to said primary substream and said n−1 phase step $k\phi_s$.

24. A generator that generates a periodic stream of digital words that occur at a clock frequency $f_{clk}$ and represent respective amplitudes of a predetermined periodic waveform wherein said periodic stream has a period P and said digital words are spaced by a phase step $\phi_s$ that is a portion of said period, the generator comprising:

a phase accumulator that generates, at a reduced clock frequency $(1/n)f_{clk}$, a primary substream of digital words wherein said primary substream has said period P and said digital words are spaced by a phase step $n\phi_s$;

an offset generator that offsets said primary substream to thereby generate n−1 secondary substreams of digital words wherein said primary and secondary substreams are phase spaced by said phase step $\phi_s$;

n phase-to-amplitude converters that each convert a respective one of said primary and secondary substreams to converted digital words that represent respective amplitudes of said periodic waveform; and     a multiplexer that interleaves said primary and secondary substreams to thereby form said periodic stream of digital words that occur at said clock frequency $f_{clk}$;

wherein said offset generator includes:

a phase-step generator that provides n−1 phase steps $k\phi_s$ wherein k represents integers from 1 to n−1; and         n−1 adders that generate said n−1 secondary substreams in response to said primary substream and said n−1 phase steps $k\phi_s$.

25. A synthesizer that generates a periodic waveform that has a period P and is quantized with a phase step $\phi_s$ at a clock frequency $f_{clk}$, the synthesizer comprising:

a phase accumulator that generates, at a reduced clock frequency $(1/n)f_{clk}$, a primary substream of digital words wherein said primary substream has said period P and said digital words are spaced by a phase step $n\phi_s$;

an offset generator that offsets said primary substream to thereby generate n−1 secondary substreams of digital words wherein said primary and secondary substreams are phase spaced by said phase step $\phi_s$;

n phase-to-amplitude converters that each convert a respective one of said primary and secondary substreams to converted digital words that represent respective amplitudes of said periodic waveform;

a multiplexer that interleaves said primary and secondary substreams to thereby form a periodic stream of digital words that occur at said clock frequency $f_{clk}$; and     a digital-to-analog converter that generates said periodic waveform in response to said periodic stream of digital words.

\* \* \* \* \*